(12) United States Patent
Beran

(10) Patent No.: US 10,245,505 B2
(45) Date of Patent: Apr. 2, 2019

(54) GENERATING CUSTOM RECORDINGS OF SKELETAL ANIMATIONS

(71) Applicant: Sony Interactive Entertainment Inc., Tokyo (JP)

(72) Inventor: Erik Beran, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/209,745

(22) Filed: Mar. 13, 2014

(65) Prior Publication Data

US 2014/0274392 A1  Sep. 18, 2014

Related U.S. Application Data

(60) Provisional application No. 61/788,276, filed on Mar. 15, 2013.

(51) Int. Cl.
*A63F 9/24* (2006.01)
*A63F 13/40* (2014.01)
(Continued)

(52) U.S. Cl.
CPC .............. *A63F 13/10* (2013.01); *A63F 13/63* (2014.09); *G06T 13/40* (2013.01);
(Continued)

(58) Field of Classification Search
CPC .... A63F 13/10; A63F 13/63; A63F 2300/695; A63F 2300/1093; A63F 2300/6607; A63F 2300/6009
See application file for complete search history.

(56) References Cited

U.S. PATENT DOCUMENTS 6,690,376 B1 * 2/2004 Saito ............... A63F 13/10
345/473
8,439,750 B2 * 5/2013 Kawamoto ........... A63F 13/10
463/30
(Continued)

FOREIGN PATENT DOCUMENTS

CN       105451837       3/2016
JP       2012-528390     11/2012
WO     WO 2014/151798    9/2014

OTHER PUBLICATIONS

Fighter Maker 2 Review. Gamespot.com. Online. Feb. 14, 2003. Accessed via the Internet. Accessed Sep. 21, 2015. <URL: http://www.gamespot.com/reviews/fighter-maker-2-review/1900-2910958/>.*

(Continued)

*Primary Examiner* — Dmitry Suhol
*Assistant Examiner* — Carl V Larsen
(74) *Attorney, Agent, or Firm* — Polsinelli LLP

(57) ABSTRACT

User-generated recordings of skeletal animations are provided. Information is stored in a memory regarding a plurality of animated movements in memory. Each animated movement may be mapped to one or more skeletal-based body parts of a game character. A recording of a plurality of user movements may be captured over a period of time. One or more body parts of the user may be identified for each captured user movement. It may then be determined which skeletal-based body parts correspond to the identified body parts of the user. A custom animation may be generated that comprises a plurality of animated movements in which the determined skeletal-based body parts are mapped to the associated animated movement. The custom animation may be stored in memory and played during play of a game as designated by the user.

18 Claims, 2 Drawing Sheets

(51) Int. Cl.
*A63F 13/63* (2014.01)
*G06T 13/40* (2011.01)

(52) U.S. Cl.
CPC ............... *A63F 2300/1093* (2013.01); *A63F 2300/6009* (2013.01); *A63F 2300/6607* (2013.01); *A63F 2300/695* (2013.01)

(56) References Cited

U.S. PATENT DOCUMENTS

| | | | |
|---|---|---|---|
| 8,462,198 B2* | 6/2013 | Lin | G06T 19/006 345/473 |
| 2003/0117392 A1* | 6/2003 | Harvill | G06T 17/10 345/419 |
| 2006/0264260 A1* | 11/2006 | Zalewski | A63F 13/06 463/36 |
| 2008/0012866 A1* | 1/2008 | Forbes | G06T 13/00 345/473 |
| 2008/0180448 A1* | 7/2008 | Anguelov | G06T 17/00 345/475 |
| 2010/0164862 A1* | 7/2010 | Sullivan | G06K 9/3216 345/156 |
| 2010/0302257 A1* | 12/2010 | Perez | G06K 9/00342 345/474 |
| 2010/0303289 A1* | 12/2010 | Polzin | A63F 13/213 382/103 |
| 2011/0007079 A1 | 1/2011 | Perez et al. | |
| 2011/0110560 A1 | 5/2011 | Adhikari | |
| 2011/0142354 A1* | 6/2011 | Sung | G06T 7/0042 382/209 |
| 2011/0306397 A1* | 12/2011 | Fleming | A63F 13/10 463/7 |
| 2011/0306398 A1* | 12/2011 | Boch | A63F 13/10 463/7 |
| 2012/0296235 A1* | 11/2012 | Rupp | A61B 5/1128 600/595 |
| 2012/0327090 A1* | 12/2012 | Yu | G06T 13/40 345/473 |
| 2013/0029791 A1* | 1/2013 | Rose | G09B 19/0038 473/409 |
| 2014/0035901 A1* | 2/2014 | Chen | G06T 13/40 345/419 |
| 2014/0267425 A1* | 9/2014 | Moll | G06T 13/80 345/638 |

OTHER PUBLICATIONS

Fighter Maker 2. www.gamefaqs.com. Online. Jan. 3, 2003. Accessed via the Internet. Accessed Aug. 19, 2017. <URL: https://www.gamefaqs.com/ps2/561656-fighter-maker-2/faqs/20959>.*

Fighter Maker. www.wikipedia.org. Online. Accessed via the Internet. Accessed Aug. 19, 2017. <URL: https://en.wikipedia.org/wiki/Fighter_Maker>.*

Fighter Maker. www.world-of-playstation.com. Online. Accessed via the Internet. Accessed Aug. 19, 2017. <URL: http://www.world-of-playstation.com/manuals/playstation/FIGHTERMAKER.shtml>.*

Fighter Maker. www.ign.com. Online. Jun. 17, 1999. Accessed via the Internet. Accessed Aug. 19, 2017. <URL: http://www.ign.com/articles/1999/06/18/fighter-maker>.*

PCT Application No. PCT/US2014/026465 International Search Report and Written Opinion dated Dec. 4, 2015.

Japanese Patent Application No. 2015-560411 Notification of Reasons for Refusal dated Aug. 18, 2016.

Japanese Patent Application No. 2015-560411 Decision of Refusal dated Nov. 25, 2016.

Chinese Patent Application No. 201480014792.6 First Office Acton dated Jul. 3, 2018.

* cited by examiner

GENERATING CUSTOM RECORDINGS OF SKELETAL ANIMATIONS

CROSS-REFERENCE TO RELATED APPLICATIONS

The present application claims the priority benefit of U.S. provisional application 61/788,276 filed Mar. 15, 2013, the disclosure of which is incorporated herein by reference.

BACKGROUND OF THE INVENTION

1. Field of the Invention

The present invention generally relates to recorded animations. More specifically, the present invention relates to user-generated recordings of skeletal animations.

2. Description of the Related Art

Presently available games may be based on detecting user movement and translating them into character movement in a game. Such games typically occur in a real-time multi-player game in which certain movements are captured by a camera or other type of motion detecting device. Such movements may then be repeated within a game via a game character performing the same move.

Such movements are generally an integral part of the game. For example, competition games involving bowling or dancing may award points and determine winners/losers based on the particular movements. As such, movements are generally only captured to the extent that they play a part in determining the game result. Moreover, such games usually include multiple players who may take turns in attempting to score. The game may therefore not be concerned with capturing movement from players whose turns have already elapsed.

In real-life, however, movement may be a form of expression, which some players may wish to incorporate into games. For example, a player playing a football game may score a touchdown and wish to do a touchdown dance. There are presently no options that would allow for such expressive movement to occur in competitive games.

There is therefore a need for improved systems and methods for user-generated recordings of skeletal animations.

SUMMARY OF THE INVENTION

Embodiments of the present invention include systems and methods for user-generated recordings of skeletal animations. Information is stored in a memory regarding a plurality of animated movements in memory. Each animated movement may be mapped to one or more skeletal-based body parts of a game character. A recording of a plurality of user movements may be captured over a period of time. One or more body parts of the user may be identified for each captured user movement. It may then be determined which skeletal-based body parts correspond to the identified body parts of the user. A custom animation may be generated that comprises a plurality of animated movements in which the determined skeletal-based body parts are mapped to the associated animated movement. The custom animation may be stored in memory and played during play of a game as designated by the user.

Various embodiments of the present invention include methods for user-generated recordings of skeletal animations. Such methods may include storing information regarding a plurality of animated movements each mapped to one or more skeletal-based body parts of a game character, capturing a recording of a plurality of user movements over a period of time, identifying one or more body parts of the user for each captured user movement, determining which skeletal-based body parts correspond to the identified body parts of the user, generating a custom animation comprising a plurality of animated movements based on the determined skeletal-based body parts, and storing the custom animation in memory to be played during play of a game as designated by the user.

Embodiments of the present invention may further include systems for user-generated recordings of skeletal animations. Such system may include memory for storing information regarding a plurality of animated movements each mapped to one or more skeletal-based body parts of a game character; a motion capture device for capturing a recording of a plurality of user movements over a period of time, a processor for executing instruction to identify one or more body parts of the user for each captured user movement, determine which skeletal-based body parts correspond to the identified body parts of the user, and generate a custom animation comprising a plurality of animated movements, wherein the determined skeletal-based body parts are mapped to the associated animated movement. The memory may also be used to store the custom animation to be played during play of a game as designated by the user.

Other embodiments of the present invention include non-transitory computer-readable storage media on which is embodied instructions executable to provide for user-generated recordings of skeletal animations in general accordance with the method previously set forth above.

DETAILED DESCRIPTION

Embodiments of the present invention allow for user-generated recordings of skeletal animations. Information is stored in a memory regarding a plurality of animated movements in memory. Each animated movement may be mapped to one or more skeletal-based body parts of a game character. A recording of a plurality of user movements may be captured over a period of time. One or more body parts of the user may be identified for each captured user movement. It may then be determined which skeletal-based body parts correspond to the identified body parts of the user. A custom animation may be generated that comprises a plurality of animated movements in which the determined skeletal-based body parts are mapped to the associated animated movement. The custom animation may be stored in memory and played during play of a game as designated by the user.

Figure 1:
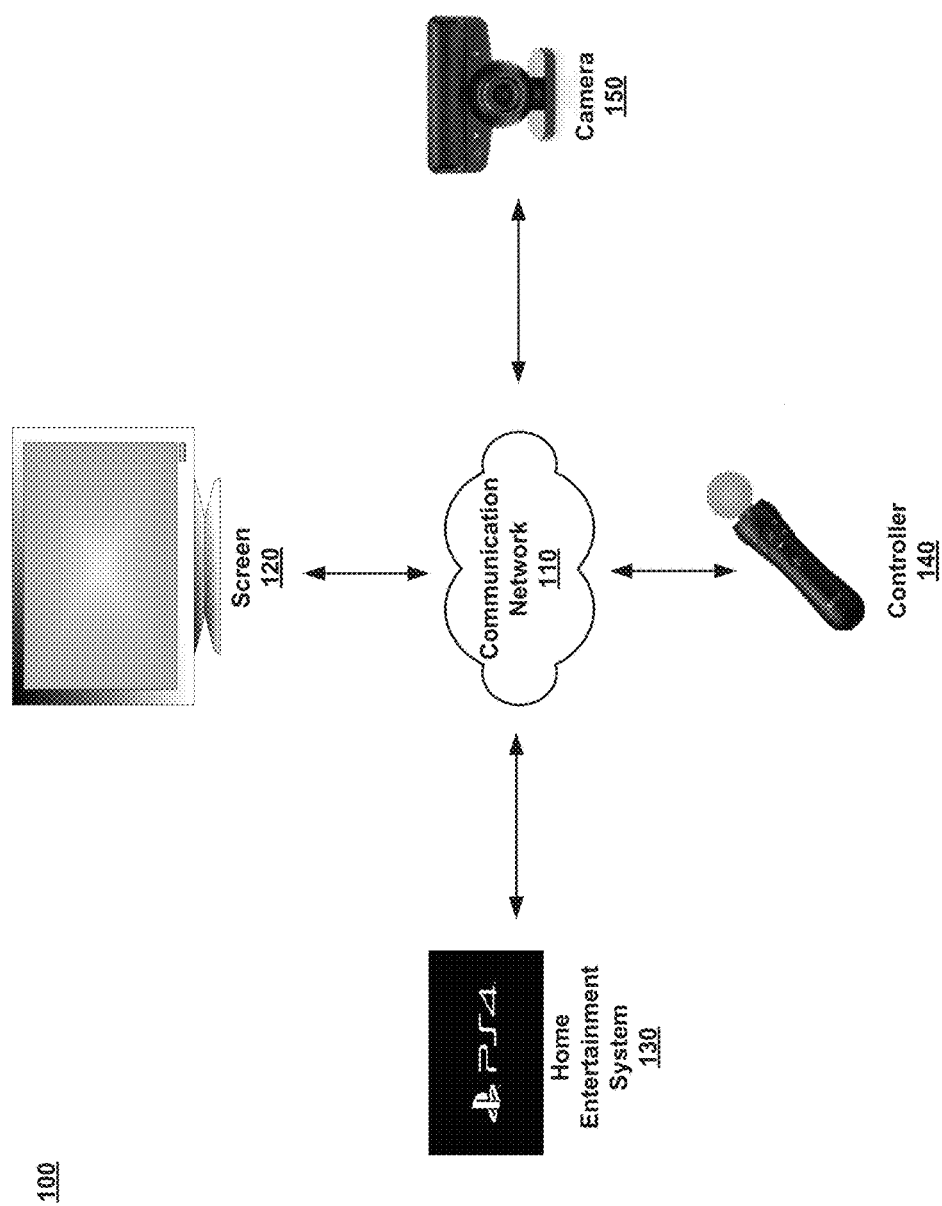
FIG. 1 is a network environment in which an exemplary system for user-generated recordings of skeletal animations may be implemented.

FIG. 1 is an network environment 100 in which an exemplary system for user-generated recordings of skeletal animations may be implemented. Network environment 100 may include a screen 120, entertainment console 130, a controller 140, and a camera 150. Such devices may communicate through wired connections (not picture), or through a communication network 110. Additional peripherals known in the art for use in conjunction with entertainment and gaming system may also be present in the environment 100.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of environment 100.

Screen 120 may include televisions, monitors, projection screens, or any display device known in the art for providing an interface for media displays, which may include displays of game environments and characters.

Users may use any number of different home entertainment systems 120, such as game consoles, gaming systems, set-top boxes, Blu-Ray® players, or a home entertainment device (e.g., Sony PlayStation®3 or Playstation®4). Home entertainment system 120 may also be configured to access data from other storage media, such as memory cards or disk drives as may be appropriate in the case of downloaded content. Home entertainment systems 120 may include standard computing components such as network and media interfaces, non-transitory computer-readable storage (memory), and processors for executing instructions that may be stored in memory.

Controller 140 may be any type of controller known in the art for detecting information regarding a user position and/or motion. Such a controller (e.g., Sony Playstation Move®) may include a variety of sensors, accelerometers, gyroscopes, magnetometers, temperature sensors, and any known sensor known in the art for capturing data regarding the position and movement of a user.

Camera 150 may be any type of camera known in the art for capturing information regarding a user position and/or motion. Such a camera (e.g., Sony Playstation Eye®) may also be able to capture color information. Camera 150 may further be associated with technology for computer vision, gesture recognition, facial recognition, and speech recognition.

Controller 140 and camera 150 may operate in conjunction to detect and capture user movement. Such user movements may be translated into animated game character movement based at least in part on game libraries related to character movement. Rather than being part of gameplay in a game involving captured movement, however, such animations may be stored for retrieval at certain points designated by user. Such animations may therefore provide for a fun expression, yet not interfere with the game. For example, the user may wish to do a celebratory dance upon scoring a goal in a soccer game. A custom animation of a celebratory dance may be triggered upon the home entertainment system 130 detecting that the user has scored a goal. The user may be able, however, to immediately get back into defensive position, since the celebratory dance is prerecorded and does not require the user to dance in real-time.

Figure 2:
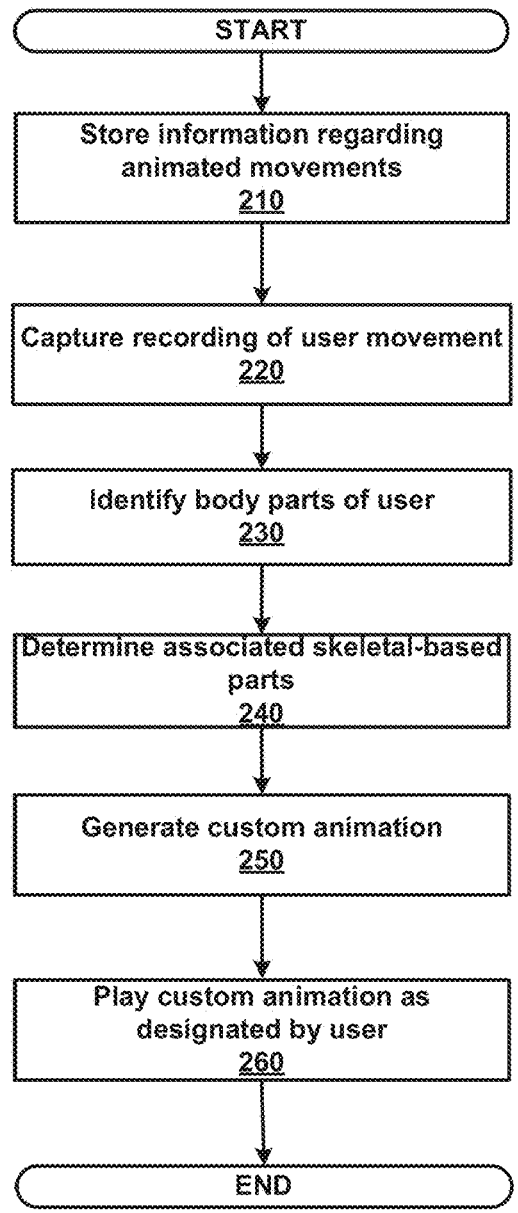
FIG. 2 is a flowchart illustrating a method for user-generated recordings of skeletal animations.

FIG. 2 is a flowchart illustrating a method 200 for user-generated recordings of skeletal animations. The method 200 of FIG. 2 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 as illustrated in FIG. 2, information is stored in a memory regarding a plurality of animated movements each mapped to one or more skeletal-based body parts of a game character, a recording of a plurality of user movements may be captured over a period of time, one or more body parts of the user may be identified for each captured user movement, it may then be determined which skeletal-based body parts correspond to the identified body parts of the user, a custom animation may be generated that comprises a plurality of animated movements in which the determined skeletal-based body parts are mapped to the associated animated movement, and the custom animation may be stored in memory and played during play of a game as designated by the user.

In step 210, information is stored in memory regarding a plurality of animated movements mapped to skeletal-based body parts. Skeletal animation allows for manipulation and management of the geometry that goes into human movements. There are variety of games that may include game libraries associated with game characters and their movements. Such libraries may be loaded into memory (e.g., via a disk) or downloaded over communication network 110.

In step 220, information regarding user movement is captured by controller 140 and/or camera 150. Such a recording may take place outside of gameplay and may be initiated by the user submitting a request or command indicating a desire to generate a custom animation to be played in a particular game.

In step 230, one or more body parts of the user may be identified from the recording, and in step 240, the identified body parts may be determined to be associated with stored skeletal-based body parts. Such processing steps allow for user movement to be translated into animated movement associated with a game character.

In step 250, a custom animation is generated and stored in memory. Such a custom animation may be a video clip or other type of content file that may be incorporated into and played in a game environment.

In step 260, the custom animation may be triggered upon detection of an in-game event designated by the user. The user may wish, for example, to do a cheer or make a rude gesture at certain points in a game. In this regard, the user may designate that the custom animation should be played when a certain in-game event is detected as having occurred. Multiple custom animations may be associated with different events The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for generating custom recordings of skeletal animations, the method comprising:
    storing a plurality of different animated movements for an animated game character in memory, wherein the plurality of different animated movements for the animated game character is mapped to at least a portion of a motion-captured plurality of user movements, each motion-captured plurality of user movements captured live by at least one sensor, and each stored animated movement being mapped to one or more skeletal-based game character body parts that are involved in the animated movement; and
    executing instructions stored in memory, wherein execution of the instructions by a processor enables custom animation of the animated game character based on the motion-captured plurality of user movements by:
        matching each of the game character body parts that is moved for each movement portion of the custom animation with a corresponding skeletal-based game character body part,
        identifying that the corresponding skeletal-based game character body part matches the first set of the mapped motion-captured plurality of user movements,
        determining that at least a portion of the game character body parts that are moved for the custom animation is associated with a movement of another body part of the user, wherein the other body part of the user is part of a second set of the motion-captured plurality of user movements, and
        generates a custom animation based on one or more stored animated movements involving the matching skeletal-based game character body parts, wherein the generated custom animation corresponds with the first set and the second set of motion-captured plurality of user movements, the custom animation further incorporating one or more animated movements mapped to the another body part of the user.

2. The method of claim 1, wherein at least part of the motion-captured plurality of user movements is captured by at least one of a camera and a controller.

3. The method of claim 1, wherein the game character body parts of the user include at least one of a head of the user and a torso of the user.

4. The method of claim 1, wherein a user designation includes designating a type of in-game event as a trigger for automatic play of the custom animation.

5. The method of claim 1, further comprising receiving at least one other custom animation and combining the custom animation with the other custom animation into a new composite animation.

6. The method of claim 1, further comprising storing a plurality of templates for custom animations and generating a custom animation file in accordance with one of the templates as designated by the user.

7. A system for generating custom recordings of skeletal animations, the system comprising:
    memory for storing a plurality of different animated movements for an animated game character in memory, wherein the plurality of different animated movements for the animated game character is mapped to at least a portion of a motion-captured plurality of user movements, each motion-captured plurality of user movements captured live by at least one sensor, and each stored animated movement being mapped to one or more skeletal-based game character body parts that are involved in the animated movement; and
    a processor for executing instruction stored in memory, wherein execution of the instructions enables custom animation of the animated game character based on the motion-captured plurality of user movements by:
        matching each of the game character body parts that is moved for each movement portion of the custom animation with a corresponding skeletal-based game character body part,
        identifying that the corresponding skeletal-based game character body part matches the first set of the mapped motion-captured plurality of user movements,
        determining that at least a portion of the game character body parts that are moved for the custom animation is associated with a movement of another body part of the user, wherein the other body part of the user is part of a second set of the motion-captured plurality of user movements, and
        generates a custom animation based on one or more stored animated movements involving the matching skeletal-based game character body parts, wherein the generated custom animation corresponds with the first set and the second set of motion-captured plurality of user movements, the custom animation further incorporating one or more animated movements mapped to the another body part of the user.

8. The system of claim 7, wherein a motion capture device that records a user performing the plurality of user movements includes at least one of a camera and a controller that detects motion.

9. The system of claim 7, wherein the game character body parts of the user include at least one of a head of the user and a torso of the user.

10. The system of claim 7, wherein the memory further stores a user designation and wherein the user designation includes designating a type of in-game event as a trigger for automatic play of the custom animation.

11. The system of claim 7, wherein another custom animation is generated and wherein further execution of instructions by the processor combines the custom animation with the other custom animation into a new composite animation.

12. The system of claim 7, wherein the memory further stores a plurality of templates for custom animations and wherein a custom animation file is generated in accordance with one of the templates as designated by the user.

13. A non-transitory computer-readable storage medium, having embodied thereon a program executable by a processor to perform a method for generating custom recordings of skeletal animations, the method comprising:

storing a plurality of different animated movements for an animated game character in memory, wherein the plurality of different animated movements for the animated game character is mapped to at least a portion of a motion-captured plurality of user movements, each motion-captured plurality of user movements captured live by at least one sensor, and each stored animated movement is mapped to one or more skeletal-based game character body parts that are involved in the animated movement; and enabling custom animation of the animated game character based on the motion-captured plurality of user movements by:

matching each of the game character body parts that are moved for each movement portion of the custom animation with a corresponding skeletal-based game character body part, identifying that the corresponding skeletal-based game character body part matches the first set of the mapped motion-captured plurality of user movements;

determining that at least a portion of the game character body parts that are moved for the custom animation is associated with a movement of another body part of the user, wherein the other body part of the user is part of a second set of the motion-captured plurality of user movements, and generating a custom animation based on one or more stored animated movements involving the matching skeletal-based game character body parts, wherein the generated custom animation corresponds with the first set and the second set of motion-captured plurality of user movements, the custom animation further incorporating one or more animated movements mapped to the another body part of the user.

14. The method of claim 1, further comprising storing a plurality of other custom animation files in memory, wherein each other custom animation file is triggered for play by a different in-game event.

15. The method of claim 1, wherein the plurality of animated movements for the game character is part of a movement library associated with the game character, and further comprising downloading the movement library over a communication network.

16. The method of claim 1, further comprising storing a plurality of movement libraries in memory, wherein each movement library is associated with a different game character and comprises a plurality of animated movements each mapped to one or more skeletal-based game character body parts that are involved in the respective animated movement of the respective different game character.

17. The method of claim 1, wherein the plurality of different stored animated movements is identified for inclusion in a custom animation file on a geometry of recorded user movements.

18. The method of claim 1, wherein movement of the game character body parts during play of the game is controlled by the user in real-time until play of the custom animation is triggered by a designated in-game event, and wherein the user is not required to trigger the custom animation in real-time.

* * * * *